(12) United States Patent
Sofos et al.

(10) Patent No.: US 8,813,114 B2
(45) Date of Patent: *Aug. 19, 2014

(54) VIDEO SERVICE BLACKOUT EVENTS

(75) Inventors: James T. Sofos, Aurora, IL (US); Lee M. Chow, Naperville, IL (US); David Piepenbrink, Chicago, IL (US); Michael Reid, Villa Park, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 425 days.

This patent is subject to a terminal disclaimer.

(21) Appl. No.: 13/328,469

(22) Filed: Dec. 16, 2011

(65) Prior Publication Data
US 2012/0089998 A1    Apr. 12, 2012

Related U.S. Application Data

(63) Continuation of application No. 12/327,102, filed on Dec. 3, 2008, now Pat. No. 8,104,056.

(51) Int. Cl.
*H04N 7/16* (2011.01)
*H04N 21/454* (2011.01)

(52) U.S. Cl.
CPC .................................. *H04N 21/454* (2013.01)
USPC .............................................. 725/25; 725/35

(58) Field of Classification Search
CPC ......................... H04N 21/454; H04N 21/4318
USPC ...................................................... 725/25–31
See application file for complete search history.

(56) References Cited

U.S. PATENT DOCUMENTS

| | | | |
|---|---|---|---|
| 8,104,056 B2 * | 1/2012 | Sofos et al. ...................... | 725/25 |
| 2005/0251843 A1 * | 11/2005 | Walker .......................... | 725/117 |
| 2007/0011702 A1 | 1/2007 | Vaysman | |
| 2007/0076872 A1 * | 4/2007 | Juneau ........................... | 380/202 |
| 2007/0198839 A1 | 8/2007 | Carle et al. | |
| 2007/0214478 A1 | 9/2007 | Feldstein et al. | |
| 2007/0226765 A1 * | 9/2007 | Bahnck et al. .................. | 725/63 |
| 2007/0250896 A1 | 10/2007 | Parker et al. | |
| 2007/0256111 A1 | 11/2007 | Medford et al. | |
| 2007/0259715 A1 * | 11/2007 | McNutt et al. .................. | 463/29 |
| 2007/0294734 A1 | 12/2007 | Arsenault et al. | |
| 2008/0066095 A1 | 3/2008 | Reinoso | |
| 2008/0066103 A1 | 3/2008 | Ellis et al. | |
| 2008/0209472 A1 | 8/2008 | Shanks et al. | |
| 2008/0256569 A1 | 10/2008 | Rhoades et al. | |
| 2009/0119696 A1 | 5/2009 | Chow et al. | |
| 2009/0178074 A1 | 7/2009 | Ellis | |
| 2009/0187938 A1 | 7/2009 | De Heer et al. | |
| 2010/0122305 A1 | 5/2010 | Moloney | |
| 2011/0030014 A1 | 2/2011 | Nadarajah | |
| 2011/0173650 A1 | 7/2011 | Jankins et al. | |

* cited by examiner

*Primary Examiner* — Junior Mendoza
(74) *Attorney, Agent, or Firm* — Toler Law Group, PC

(57) ABSTRACT

A method includes receiving, at a component of a multimedia content distribution system, a command including blackout information related to a first version of content. The blackout information includes scheduling information. The method includes updating a first entry within a control matrix based on the blackout information in response to the command. The first entry includes information related to when the first version of the content in a first stream is to be blacked out based on the scheduling information. The method also includes updating a second entry within the control matrix based on the blackout information in response to the command. The second entry includes information related to when the second version of the content in a second stream is to be blacked out based on the scheduling information. The method also includes sending a control stream based on the control matrix to one or more set top boxes.

20 Claims, 7 Drawing Sheets

400

406

| 11 | 12 | 13 | ... | 162 | 163 | 164 |
| 21 | 22 | 23 | ... | 262 | 263 | 264 |
| 31 | 32 | 33 | ... | 362 | 363 | 364 |
| ⋮ | ⋮ | ⋮ | ... | ⋮ | ⋮ | ⋮ |
| 621 | 622 | 623 | ... | 6262 | 6263 | 6264 |
| 631 | 632 | 633 | ... | 6362 | 6363 | 6364 |
| 641 | 642 | 643 | ... | 6462 | 6463 | 6464 |

404 points to row starting 11; 402 points to row starting 621

US 8,813,114 B2

VIDEO SERVICE BLACKOUT EVENTS

PRIORITY CLAIM

This application is a continuation patent application of, and claims priority from, U.S. patent application Publication Ser. No. 12/327,102, filed on Dec. 3, 2008 and entitled "Video Service Blackout Events," which is hereby incorporated by reference in its entirety.

FIELD OF THE DISCLOSURE

The present disclosure is generally related to video service blackout events.

BACKGROUND

Media service providers, such as television service providers, acquire content from content providers, such as television networks, and distribute the content to subscribers. Some content is subject to access restrictions, such as blackouts. Typically, conditional access events, such as blackouts, are scheduled manually by a media service provider. This can make conditional access scheduling labor-intensive and prone to error, especially for picture-in-picture video services.

DETAILED DESCRIPTION

Figure 1:
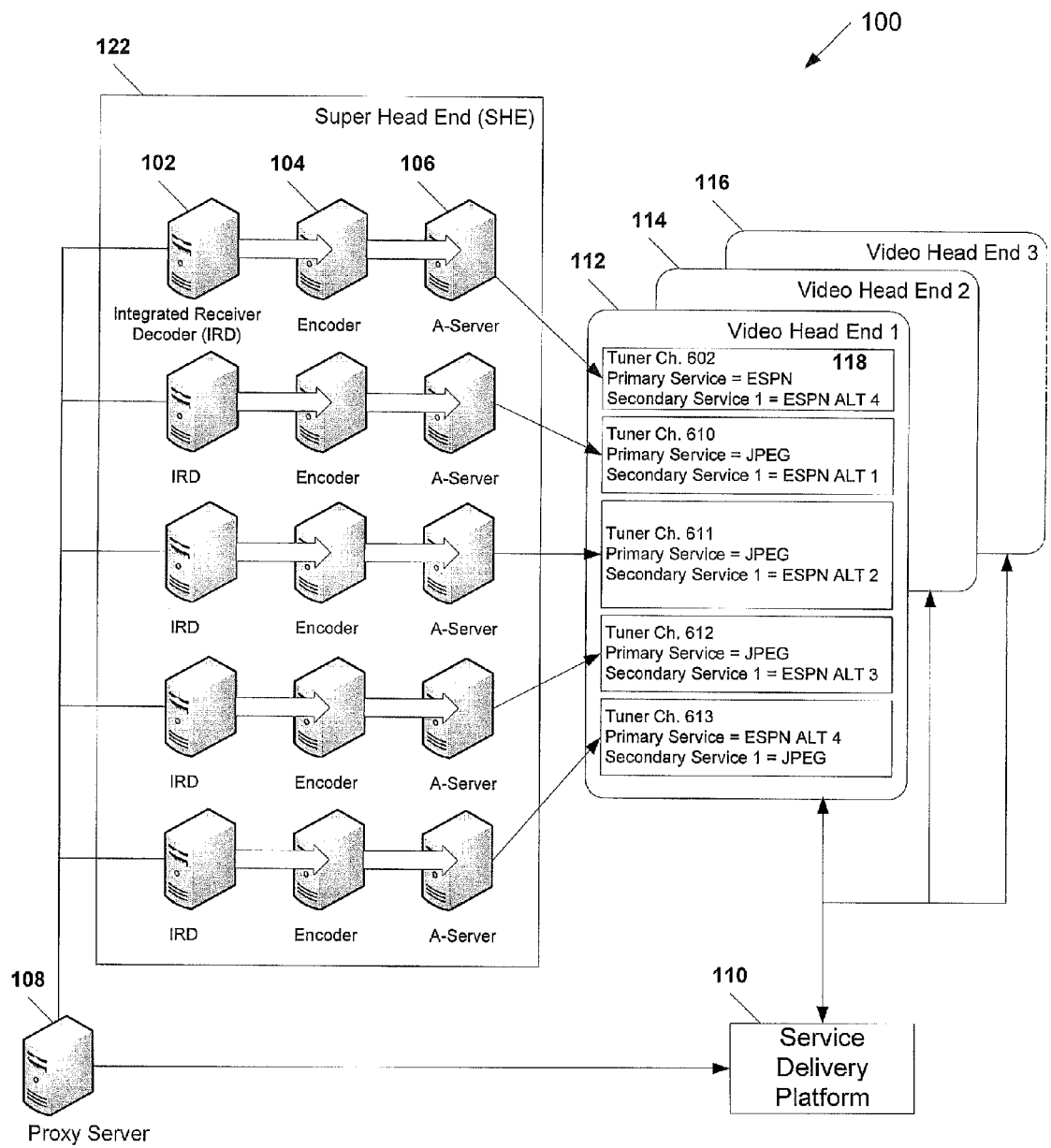
FIG. 1 is a block diagram of a particular embodiment of a system to restrict access to media content.

In a particular embodiment, a method is disclosed that includes receiving, at a component of a multimedia content distribution system, a command including blackout information related to a first version of content. The blackout information includes scheduling information. The method includes, in response to the command, updating a first entry within a control matrix based on the blackout information. The first entry includes information related to when the first version of the content in a first stream is to be blacked out based on the scheduling information. The method also includes, in response to the command, updating a second entry within the control matrix based on the blackout information, where the second entry includes information related to when the second version of the content in a second stream is to be blacked out based on the scheduling information. The method also includes sending a control stream based on the control matrix to one or more set top boxes.

In a particular embodiment, a method is disclosed and includes receiving a command to blackout a full screen version of content at a component of a multimedia content distribution system. The method also includes updating a first entry within a control matrix to reflect that the full screen version of the content is to be blacked out. The method also includes automatically updating a second entry within the control matrix to reflect that a picture-in-picture (PIP) version of the content is to be blacked out.

In another particular embodiment, a system is disclosed that includes a processor and a memory accessible to the processor. The memory includes instructions executable by the processor to cause the processor to receive, at a component of a multimedia content delivery platform, a command including blackout information related to an event. The memory also includes instructions executable by the processor to cause the processor to, in response to the command, update a first entry within a control matrix based on the blackout information, where the first entry includes information related to a first stream associated with the event. The memory also includes instructions executable by the processor to cause the processor to send a control stream based on the control matrix to one or more set top boxes.

In another particular embodiment, a system is disclosed that includes a user interface. The system also includes a control system operatively coupled to the user interface. The control system is adapted to receive a command to blackout a full screen version of content at a component of a multimedia content delivery platform. The control system is further adapted to update a first entry within a control matrix to reflect that the full screen version of the content is to be blacked out. The control system is adapted to automatically update a second entry within the control matrix to reflect that a picture-in-picture (PIP) version of the content is to be blacked out.

In another particular embodiment, a method is disclosed that includes receiving, at a media distribution system, a command including blackout information related to a first version of content and related to substitute content to replace the first version of content. The method also includes, in response to the command, generating first control data based on the blackout information, where the first control data includes information related to a first stream associated with the first version of the content distributed by the media distribution system, and where the first control data includes information related to the substitute content to replace the first version of content. The method also includes, in response to the command, generating second control data based on the blackout information, where the second control data includes information related to a second stream associated with a second version of the content distributed by the media distribution system, and wherein the second control data includes information related to the substitute content to replace the second version of content. The method also includes sending a control stream based on a control matrix including the first control data and the second control data to one or more set top boxes.

In another particular embodiment, a method is disclosed that includes receiving a command to blackout a first version of content at a media distribution system. The method also includes generating first control data to blackout the first version of the content distributed by the media distribution system in a blackout geographic region. The method also includes automatically generating second control data to blackout a second version of the content distributed by the media distribution system in the blackout geographic region.

Referring to FIG. 1, a block diagram of a particular embodiment of a system to restrict access to media content is illustrated and designated generally 100. The system includes a plurality of integrated receiver-decoders (IRDs) 102 that communicate with a proxy server 108. Each IRD 102 also communicates with an acquisition server (A-server) 106 via an encoder 104. The proxy server 108 communicates with a service delivery platform (SDP) 110. Further, the SDP 110 communicates with a plurality of video head-ends 112-116. Each video head-end is adapted to distribute media to client devices (such as a set top box or other network appliance) within a particular geographical area. In one embodiment, the proxy server 108 and the SDP 110 are included in a conditional access provisioning system of a video distribution network, such as an Internet Protocol Television (IPTV) network. Alternatively, the proxy server 108 can be integrated with the SDP 110.

In a particular embodiment, each IRD 102 serves a plurality of geographic areas via the video head-ends 112-116. Each IRD 102 receives a media content stream corresponding to a particular television channel, such as a video content channel or music content channel. In an illustrative embodiment, the media content stream can be a Moving Picture Experts Group (MPEG) stream that includes video content, audio content, other media content, or a combination thereof. In addition, each IRD 102 receives a command via a control stream related to delivery of media content received via the media content stream. Each IRD 102 is adapted to determine whether the control stream includes data indicating that the media content is subject to an access restriction, such as a blackout, a limitation on access to users associated with a particular subscription level, a limitation on access to users who pay for media content corresponding to the media content stream, or a combination thereof.

Each IRD 102 is adapted to send its control stream to the SDP 110 via the proxy server 108, when the control stream includes data indicating that the media content is subject to one or more access restrictions. Further, each IRD 102 is adapted to send the media content stream to the encoder 104. The encoder 104 is adapted to encode the content portion for transmission via the video distribution network by the A-server 106 that corresponds to the television channel.

The SDP 110 is adapted to parse the control stream into data elements and to derive conditional access information from the parsed data elements. The conditional access information can include a geographical area in which the media content is to be restricted, a subscriber group to whom the media content is to be restricted, a start time of the restriction, an end time of the restriction, a type of restriction, a channel or virtual channel affected by the restriction, or any combination thereof. In an illustrative embodiment, a geographical area can be indicated by a geographical region code (GRC). The SDP 110 is adapted to automatically schedule a conditional access event at a video head-end associated with the geographical area(s) in which the media content is to be restricted, such as the video head-end 112. The SDP 110 can call a scheduling application programming interface (API) at the super head-end (SHE) 122 and interact with the scheduling API to schedule the conditional access event for main streams sent to client devices, secondary streams (e.g., picture-in-picture streams), or a combination thereof. In one embodiment, the conditional access information can indicate that the media content is to be restricted in multiple geographical areas, and the SDP 110 can be adapted to automatically schedule the conditional access event at a plurality of video head-ends, such as all of the video head-ends 112-116.

In a particular embodiment, the conditional access information can indicate that the media content subject to a restriction is to be replaced with substitute content. The conditional access information can identify the substitute content. The conditional access information can also identify the primary content (i.e., the media content subject to the restriction), a channel that would otherwise deliver the primary content, or a combination thereof. In one embodiment, the conditional access information can identify the primary content, the substitute content, or any combination thereof, as one or more virtual channels. The SDP 110 is adapted to determine an acquisition point of the substitute content, such as a particular acquisition server associated with a virtual channel corresponding to the substitute content.

Additionally, the SDP 110 is adapted to automatically schedule the substitution at the SHE 122. In an illustrative embodiment, the SDP 110 is adapted to create a substitution table at the SHE 122, where the substitution table maps the primary content to the substitute content. The substitution table can also indicate the acquisition point of the substitute content, such as another acquisition server 106. For example, as shown in FIG. 1, a first substitution table 118 for a first channel (e.g., channel 602) can indicate that a primary service (e.g., ESPN) provided by a first acquisition server is to be replaced with a secondary service (e.g., ESPN ALT 4) provided by another fifth acquisition server. In another embodiment, the substitution table 118 can map a start time, end time, and channel to the substitute content.

In a particular embodiment, the SDP 110 is adapted to receive second control stream data related to television programming or other media content that is subject to the scheduled conditional access event. The SDP 110 parses the second control stream data and derives conditional access update information from the parsed second control stream data. The conditional access update information indicates that a previously scheduled conditional access event is to be deleted or modified. For example, the conditional access update information can indicate that a blackout is no longer applicable to a particular television program or that certain users can receive a blacked out program. In another example, the update information can indicate that a start time of the blackout, an end time of the blackout, substitute content to be delivered during the blackout, one or more geographical areas to which the blackout applies, or any combination thereof, have been updated.

The SDP 110 is adapted to identify a previously scheduled conditional access event to which the update information applies. Further, the SDP 110 is adapted to automatically modify or delete the scheduled conditional access event at the SHE 122 at which the conditional access event was scheduled. In a particular embodiment, the SDP 110 logs receipt of the update information. For instance, a SDP database can store data indicating that update information has been received, a time at which the update information was received, at least a portion of the contents of the update information, or a combination thereof.

In an illustrative embodiment, the SDP 110 can be adapted to determine whether the update information derived from the second control stream data indicates that substitute content associated with the conditional access event is to be modified or deleted (i.e., when the conditional access event no longer applies). If the substitute content is to be modified or deleted, the SDP 110 can be adapted to automatically call a substitution API at the SHE 122 to modify or delete a substitution table associated with the conditional access event (e.g., substitution table 118).

Figure 2:
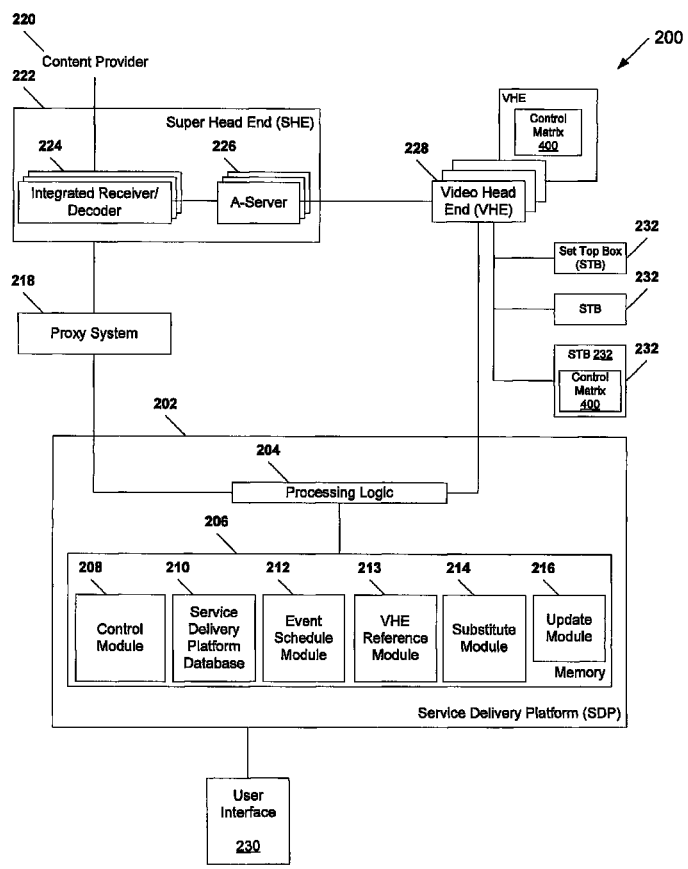
FIG. 2 is a block diagram of a second particular embodiment of a system to restrict access to media content.

Referring to FIG. 2, a block diagram of a second particular embodiment of a system to restrict access to media content is illustrated and designated generally 200. The system includes a service delivery platform (SDP) 202 that communicates with a video super head end (SHE) 222 via a proxy system 218. Alternatively, the proxy system 218 can be integrated with the SDP 202. The SHE 222 communicates with at least one content provider 220. Further, the SDP 202 communicates with a plurality of video head-ends (VHEs) 228. Each of the VHEs 228 serves media content to client devices such as set top boxes (STBs) 232 of a video distribution system within a particular geographical area.

In one embodiment, the content provider 220 sends a media content stream to the SHE 222. If the content provider 220 determines that the media content is subject to a conditional access restriction, the content provider 220 also sends a control stream to the SHE 222. The control stream includes parsable control data indicating at least one geographical area or other subscriber group for which access to the media content is to be restricted.

In an illustrative embodiment, the SHE 222 includes a plurality of integrated receiver-decoders (IRDS) 224. Each IRD 224 is coupled to one of a plurality of acquisition servers (A-servers) 226. In a particular embodiment, each IRD 224 is adapted to receive a media content stream associated with a different channel or virtual channel from a content provider, such as the content provider 220, and to deliver corresponding media content to client devices via the video distribution system. In an illustrative embodiment, the media content stream is a Moving Picture Experts Group (MPEG) stream. Each IRD 224 sends media content associated with a received media content stream to an A-server 226 to which it is coupled. Each A-server 226 can distribute the media content to one or more of the VHEs 228 for delivery to client devices in one of a plurality of geographical areas served by the VHEs 228.

Further, each IRD 224 is adapted to receive a control stream related to delivery of media content received via its media content stream. Each IRD 224 is adapted to determine whether the control stream includes data indicating that the media content associated with the media content stream is subject to one or more access restrictions, such as a blackout, a limitation on access to users associated with a particular subscription level, a limitation on access to users who pay for media content corresponding to the media content stream, or a combination thereof. The IRD 224 is adapted to send the control stream to the SDP 202 via the proxy system 218, when the control stream includes data indicating that the media content is subject to one or more access restrictions.

The SDP 202 includes processing logic 204 and memory 206 accessible to the processing logic 204. The memory 206 includes a plurality of modules 208-216 that are adapted to provide various functions of the SDP 202 with respect to automatically provisioning conditional access with respect to media content. The modules 208-216 can include data stores, hardware logic, instructions executable by the processing logic 204, such as instructions included in one or more computer programs or operating systems, or any combination thereof.

For example, in the embodiment shown, the memory 206 includes a control module 208 that is executable by the processing logic 204 to receive control streams from the IRDS 224 via the proxy system 218. Further, the control module 208 is executable by the processing logic 204 to parse each control stream and to derive conditional access information from the parsed control stream. The conditional access information may include a geographical area in which the media content is to be restricted, a subscriber group to which the media content is to be restricted, a start time of the restriction, an end time of the restriction, a type of restriction, a channel affected by the restriction, substitute content to replace the restricted media content, or any combination thereof. In an illustrative embodiment, the geographical area can be indicated by a geographical region code (GRC).

In the embodiment shown, the memory 206 also includes a SDP database 210 to log receipt of control stream data indicating a conditional access event. For instance, the SDP database 210 can store data indicating that the control stream data was received, a time at which the control stream data was received, at least a portion of the conditional access information, or any combination thereof.

In the embodiment shown, the memory 206 includes an event schedule module 212 that is executable by the processing logic 204 to automatically schedule a conditional access event at the SHE 222. Geographies may be predefined to accounts by API calls to the VHEs 228 to group the accounts accordingly. From the VHEs 228, the grouping data flows to the accounts in advance of a substitution event. In one embodiment, the conditional access information can indicate that the media content is to be restricted in multiple geographical areas, and the event schedule module 212 is executable by the processing logic 204 to automatically schedule the conditional access event at the SHE 222. For example, the media content can be subject to a blackout in multiple geographical areas. In another embodiment, the event schedule module 212 is executable by the processing logic 204 to schedule a plurality of different types of conditional access event at the SHE 222. For instance, the media content can be subject to a blackout in a first geographical area and restricted to paying users or users associated with a certain subscription level in another geographical area. In a particular embodiment, the memory 206 can include a VHE reference module 213 to store data indicating which of the VHEs 228 is associated with a particular geographical area.

In an exemplary embodiment, the SDP 202 further includes a user interface 230 including a keyboard, mouse, display, and/or other devices through which an operator may review and/or edit information passing through or resident on the SDP 202, including information from control streams sent to the SDP 202 from the SHE 222 from the content provider 220. An operator may use the user interface 230 to manually override automated processes instigated by the processing logic 204 in response to control streams, to fix problems that may have occurred in the automated processes, or merely to monitor ongoing automated processes as desired.

In a particular embodiment, the conditional access information can indicate that the media content subject to a restriction is to be replaced with substitute content. The conditional access information can identify the substitute content. The conditional access information can also identify the primary content (i.e., the media content subject to the restriction), a channel that would otherwise deliver the primary content, or any combination thereof. The memory 206 may include a substitute module 214 that is executable by the processing logic 204 to determine an acquisition point of the substitute content, such as a particular acquisition server 226, and to schedule the substitution at one or more of the video head-ends 228.

In an illustrative embodiment, the substitute module 214 is executable by the processing logic 204 to create a substitution table at one or more video head-ends 228, where the substitution table maps the primary content to the substitute content. The mapping may be accomplished by providing an IPTV API with one or more global unique identifiers (GUIDs) that identify the IPTV Services which are substitutable for one another. In another embodiment, the substitution table can map a start time, end time, and channel to the substitute content.

In a particular embodiment, the control module 208 is executable by the processing logic 204 to receive second control stream data related to television programming or other media content that is subject to the scheduled conditional access event. The control module 208 is executable by the processing logic 204 to parse the second control stream data and derive conditional access update information from the parsed second control stream data. The conditional access update information includes data indicating that a previously scheduled conditional access event is to be deleted or modified. For example, the conditional access update information can indicate that a blackout is no longer applicable to a particular television program or that certain users can receive a blacked out program. In another example, the update information can indicate that a start time of the blackout, an end time of the blackout, substitute content to be delivered during the blackout, one or more geographical areas to which the blackout applies, or any combination thereof, have been updated.

In the embodiment shown, the memory 206 includes an update module 216 that is executable by the processing logic 204 to identify a previously scheduled conditional access event to which the update information applies. For instance, the previously scheduled conditional access event can be retrieved from the SDP database 210, or the conditional access update information can indicate the previously scheduled conditional access event. The update module 216 is executable by the processing logic 204 to automatically modify or delete the scheduled conditional access event at the SHE 222. In a particular embodiment, the SDP database 210 logs receipt of the update information. For instance, the SDP database 210 can store data indicating that update information has been received, when the update information was received, at least a portion of the contents of the update information, or any combination thereof.

In an illustrative embodiment, the control module 208 is executable by the processing logic 204 to determine whether the update information derived from the second control stream data indicates that substitute content associated with the conditional access event is to be modified or deleted (i.e., when the conditional access event no longer applies). If the substitute content is to be modified or deleted, the update module 216 is executable by the processing logic 204 to automatically call a substitution application programming interface (API) at the SHE 222 to modify or delete a substitution table associated with the conditional access event.

Figure 3:
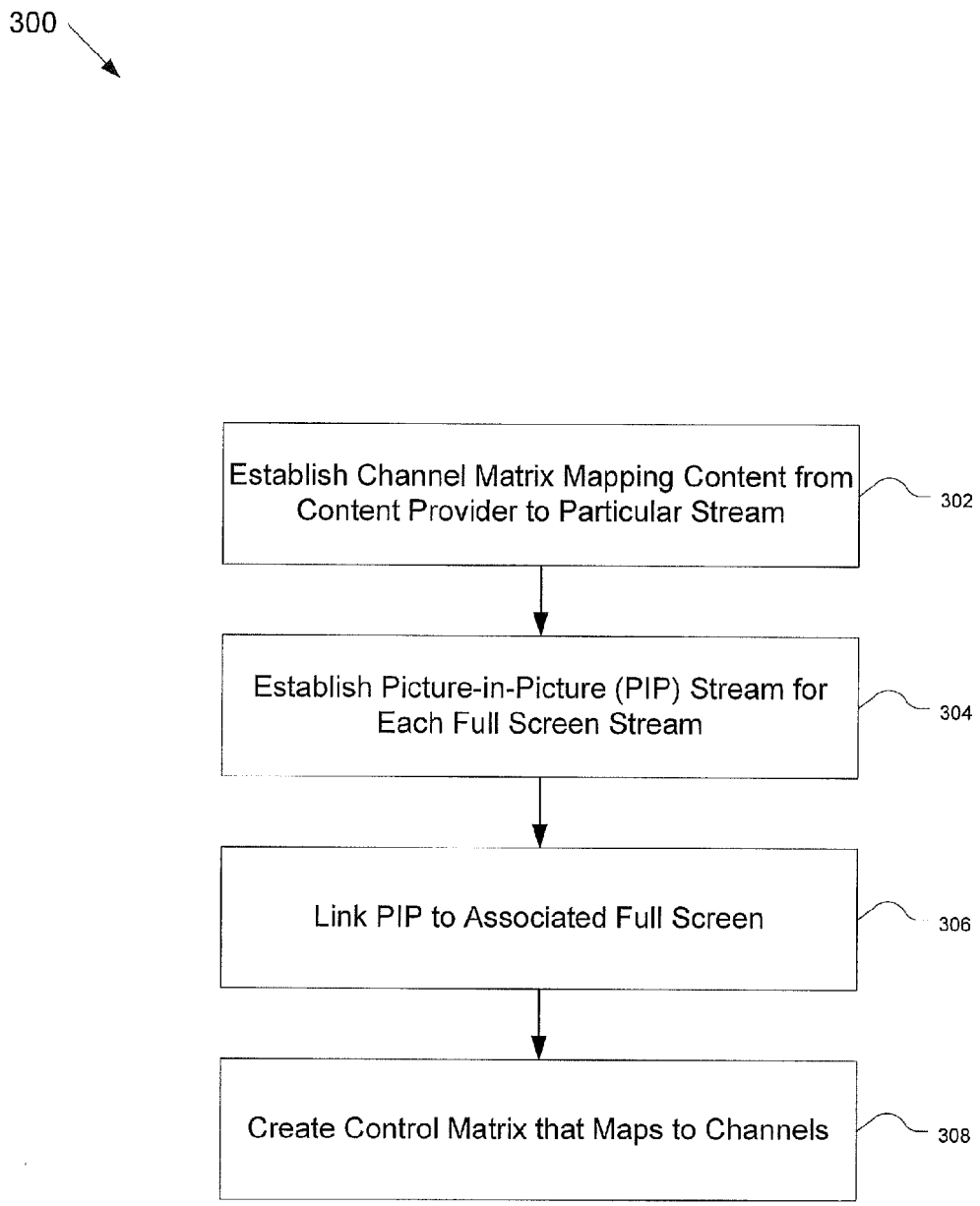
FIG. 3 is a flow diagram of an exemplary embodiment of a method of creating a control matrix for use with at least one embodiment of the present disclosure.

Referring to FIG. 3, a flow diagram of an exemplary embodiment of a method of creating a control matrix is illustrated generally, at 300. The operator may establish a channel matrix that maps content from a particular content provider to a particular channel stream that the operator is to provide at 302. For example, a first channel stream may be on channel one, a second channel stream on channel two, a third channel stream on channel three, a fourth channel stream on channel four, and so on. In an exemplary embodiment, each particular channel stream is a full screen service for its content. For each full screen stream, the operator may further establish a picture-in-picture (PIP) stream, at 304. Thus, each channel has at least two effective channels within the channel matrix, namely a full screen stream and a picture-in-picture stream.

The operator may then link the full screen stream to the picture-in-picture stream for each channel stream within the channel matrix, at 306. In an exemplary embodiment, the link is a pointer that points to the picture-in-picture stream. Other links are also contemplated by the present disclosure. Based on the channel matrix so created, the operator may create a control matrix that maps control information to each of the channels within the channel matrix, at 308. The control matrix may then be distributed to the video head ends for distribution to the client devices (such as the subscriber set top boxes 232 of FIG. 2). While full screen and picture-in-picture streams are specifically contemplated, the disclosure is not so limited. Rather, this sort of linking and automatic updating may be applied to other streams sharing content, or other versions of the same content such as where a first version of the content is larger than a second version of the content (e.g., split screen 2/3 and 1/3 or the like).

Figures 4, 5:
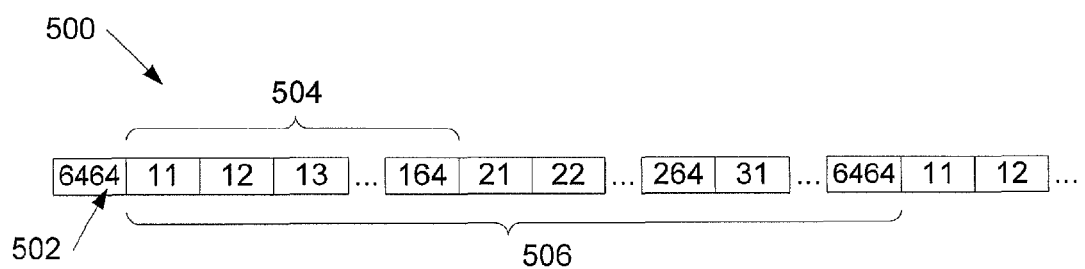
FIG. 4 illustrates an exemplary control stream.
FIG. 5 illustrates an exemplary control matrix suitable for insertion into or operable to be derived from a control stream.

Referring to FIG. 4, an exemplary control matrix 400 is illustrated. The control matrix 400 includes multiple cells 402 arranged into rows 404 and columns 406. For example, in the embodiment shown, the control matrix 400 is a sixty-four by sixty-four grid of cells 402. Alternatively, the control matrix 400 may be up to 32 services×256 geographies. Each cell 402 is adapted to hold control information about an associated channel. Thus cell $402_{1,1}$ may correspond to the cell in the first row 404, first column 406 position while cell $402_{64,64}$ may correspond to the cell in the last row 404, last column 406 position. Cell $402_{1,1}$ may further correspond to a full screen stream service and cell $402_{1,2}$ may correspond to a picture-in-picture stream service. Note that such designations are for the sake of example, and the operator may design a control matrix based on content being provided, content provider requirements or other criteria, as desired.

Control matrix 400 may readily be ported to an exemplary control stream 500, as illustrated in FIG. 5. However, a control stream 500 is a one dimensional element, and the two-dimensional control matrix 400 of FIG. 4 is disassembled from the two-dimensional form and reassembled into a linear, one dimensional form. One manner in which this reassembly may be done is to put the rows of the control matrix 400 end-to-end. Thus, the control stream 500 may include cells 502 that map to cells 402 of the control matrix 400. Further, groups 504 correspond to the rows 404 as referenced in FIG. 4. A metagroup 506 of cells 502 may form a single retune message sent to set top boxes or other network devices within the IPTV network described with reference to FIGS. 1 and 2. As noted above, set top boxes within the IPTV system are programmed to parse the control stream 500 to determine control information about channels being streamed to the set top box. For example, the set top box may be programmed to look in cell $502_{1,1}$ for control information about the full screen stream. Such programming may be invoked each time the customer tunes his television or set top box to the full screen stream.

Figure 6:
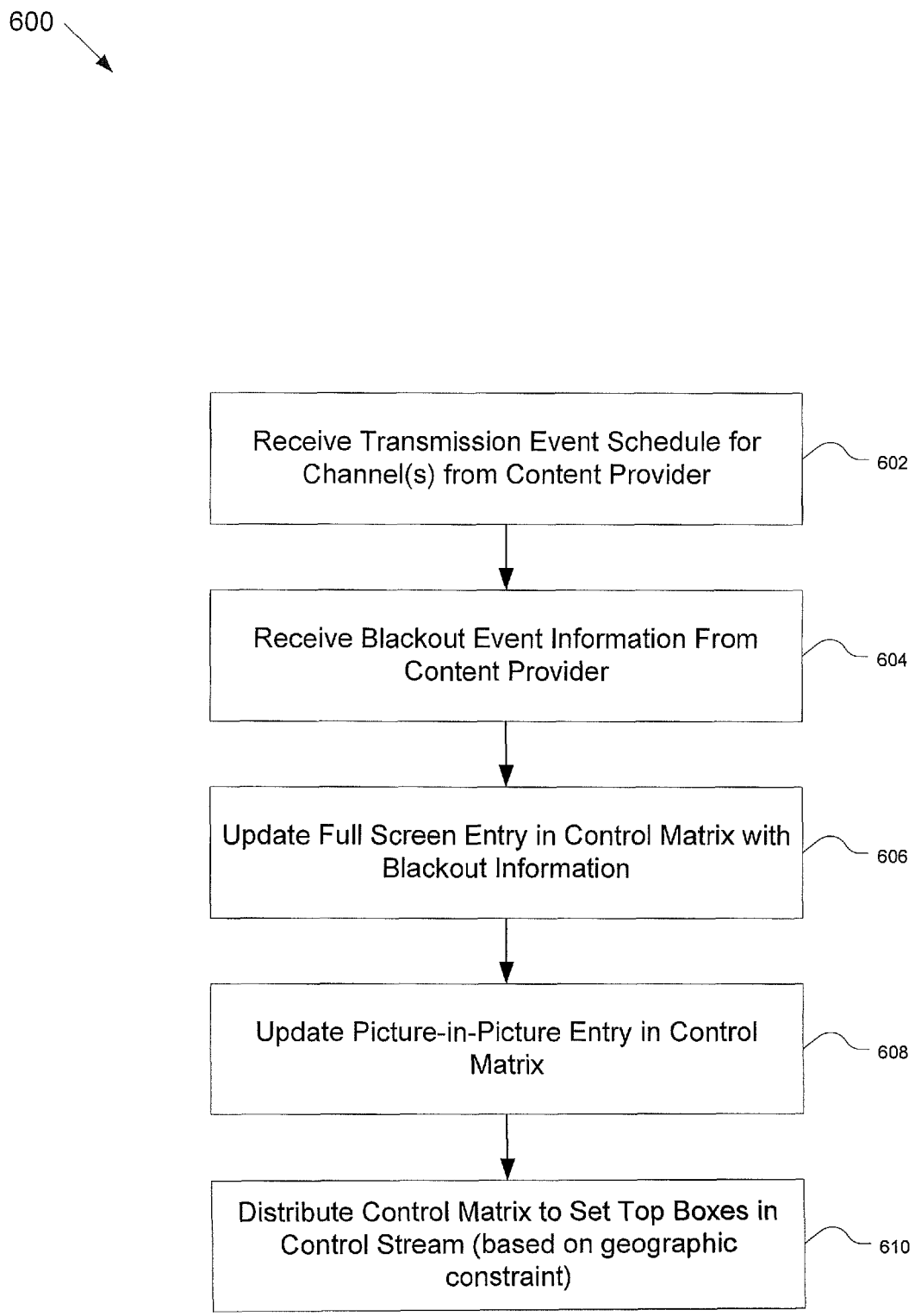
FIG. 6 is a flow chart showing an exemplary method of scheduling and updating picture-in-picture services for blackout events.

By having a predefined control matrix and links between the full screen versions and picture-in-picture versions of content channels, it may be easier to update blackout information for content as illustrated by exemplary method 600 of FIG. 6. A control system of an operator (e.g, processing logic 204 as programmed by control module 208 described above with reference to FIG. 2) receives a transmission event schedule for one or more channels from a content provider, at 602.

The operator receives blackout information from the content provider relating to the transmission event schedule, at 604. As noted above with reference to FIGS. 1 and 2, the content provider may initially provide this information in the form of a control stream sent to an IRD 102 or SHE 222. This blackout information may be sent electronically and conform to some predetermined format that allows the control system of the operator to automatically parse the message and update the full screen entry in the control matrix with the blackout information at 606. For example, if a content provider informs the operator that the DUKE vs. GEORGIA TECH basketball game is to be blacked out in Nebraska, the operator may parse that information and update cell $402_{1,1}$ in the control matrix of FIG. 4.

The control system may then detect or refer to the link (see block 306 of FIG. 3) and update the picture-in-picture entry in the control matrix, at 608. Continuing the above example, the control system updates a cell 402, such as cell $402_{1,2}$ in the control matrix 400 of FIG. 4. The control system may then distribute the updated control matrix to set top boxes in the control stream, (e.g., STBs 232 of FIG. 2), at 610. The control matrix may be distributed to set top boxes within particular geographic areas that are affected by a change or the information in the control message may have geographic information included therein such that the set top box may evaluate the geographic information and determine whether a change applies to the particular set top box.

Figure 7:
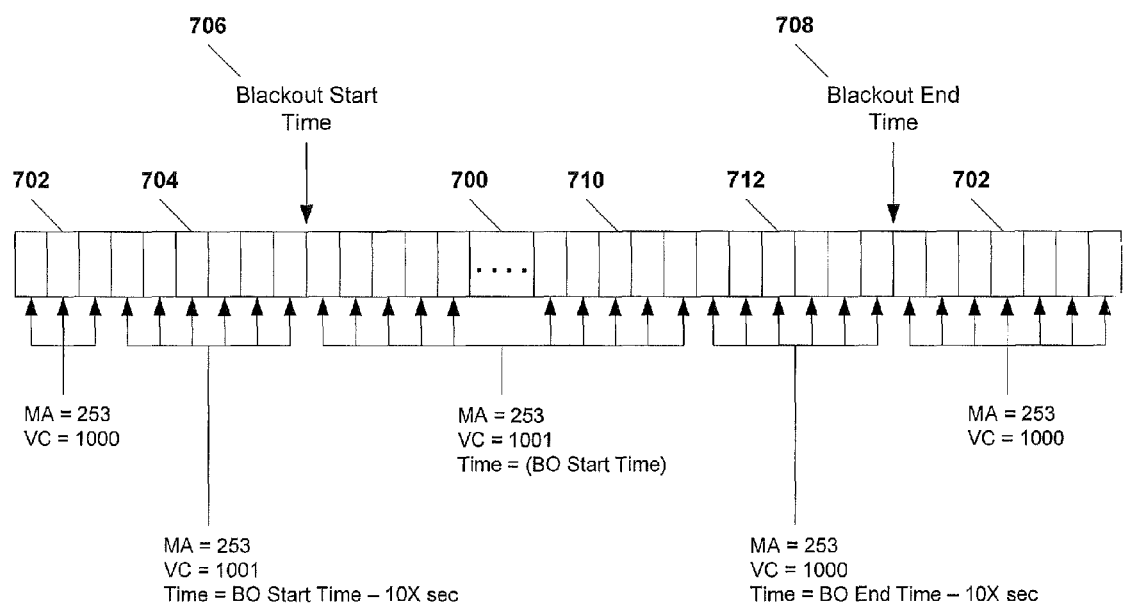
FIG. 7 is a general diagram of an illustrative embodiment of a video stream that includes blackout information.

Referring to FIG. 7, a general diagram of an illustrative embodiment of a control stream being used to implement a blackout event is illustrated and designated generally 700. The control stream 700 includes a plurality of retune messages sent, for example, at ten second intervals. For example, the control stream 700 includes one or more first retune messages 702 indicating that primary media content, such as media content associated with a virtual channel (VC) 1000, is to be delivered to a geographic area corresponding to a multicast address (MA) 253. In one embodiment, one or more particular integrated receiver-decoders (IRDs) at a video super head-end can be associated with the multicast address 253, where the IRD(s) are allocated to the geographic area.

In addition, the control stream 700 includes a plurality of second retune messages 704 indicating that the geographic area corresponding to the multicast address 253 is to receive substitute content associated with a second virtual channel 1001, beginning at a blackout start time 706 and ending at a blackout end time 708. In one embodiment, the second retune messages 704 can occur within the control stream 700 at ten-second intervals, beginning one minute prior to the blackout start time 706.

During a period between the blackout start time 706 and the blackout end time 708, a plurality of third retune messages 710 indicate that the geographic area corresponding to the multicast address 253 is to receive media content associated with the virtual channel 1001. In addition, the fourth retune messages 712 indicate that the geographic area corresponding to the multicast address 253 is to begin receiving media content associated with the virtual channel 1000 at the blackout end time 708. The fourth retune messages can occur within the control stream 700, for example, at ten second intervals beginning one minute before the blackout end time 708.

Thus, a content provider provides its control stream to a super head-end (e.g., SHE 222 of FIG. 2), which passes the information in the control stream 700 to service a delivery platform (e.g. SDP 202 of FIG. 2). Processing logic parses the control stream into a control matrix (e.g., control matrix 400 of FIG. 4). The control matrix is reformatted into a control stream (e.g., control stream 500 of FIG. 5) and sent to one or more set top boxes (e.g., STBs 232 of FIG. 2). Because the information in the control stream is updated with some regularity as content providers provide updates as to blackout events and the like, the control stream is updated and resent to the set top boxes. This process of updating and resending the control stream is illustrated by the control stream 700 of FIG. 7.

In conjunction with the configuration of structure provided herein, a system and method of restricting access to media content are provided in which automated, software-based scheduling and execution of blackouts and other conditional access events occur based on a control stream that is received and parsed at a service delivery platform or other conditional access provisioning system of a video distribution network, such as an Internet Protocol Television (IPTV) network. In other embodiments, the system and method can be applied to a cable network, a satellite dish network, or other video distribution network adapted to deliver video traffic via similar architectures.

Figure 8:
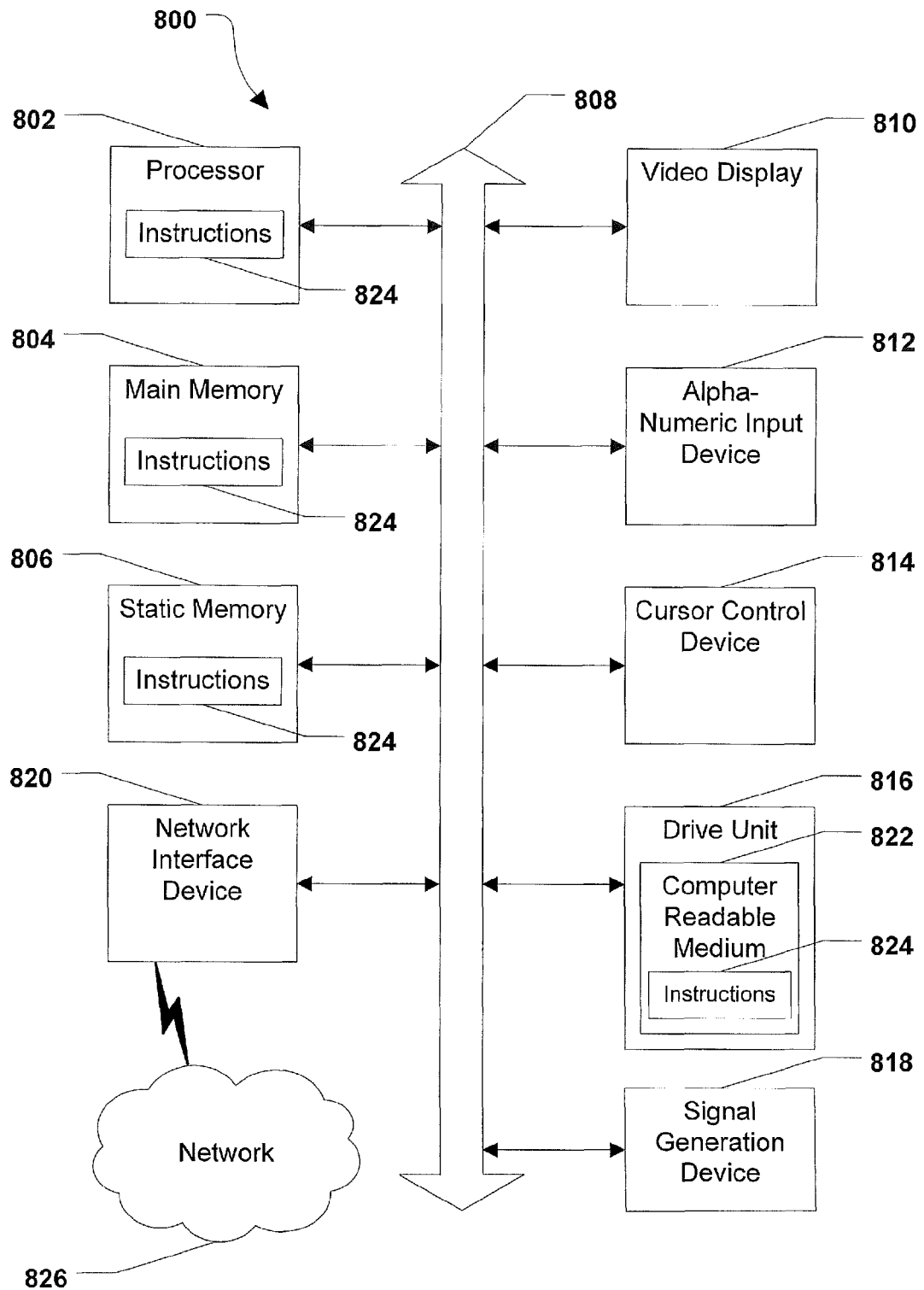
FIG. 8 is a block diagram of an illustrative embodiment of a general computer system.

Referring to FIG. 8, an illustrative embodiment of a general computer system is shown and is designated 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 800 can be implemented using electronic devices that provide video, audio, or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. Moreover, the computer system 800 can include a main memory 804 and a static memory 806, which can communicate with each other via a bus 808. As shown, the computer system 800 may further include a video display unit 810, such as a liquid crystal display (LCD), a projection television system, a flat panel display, a solid state display, or a cathode ray tube (CRT). Additionally, the computer system 800 may include an input device 812, such as a keyboard, and a cursor control device 814, such as a mouse. The computer system 800 can also include a disk drive unit 816, a signal generation device 818, such as a speaker or remote control, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered equivalent to a tangible storage medium. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
receiving, at a component of a multimedia content distribution system, a command including blackout information related to a first version of content, wherein the blackout information includes scheduling information;
in response to the command, updating a first entry within a control matrix based on the blackout information, wherein the first entry includes information related to when the first version of content in a first stream is to be blacked out based on the scheduling information;
in response to the command, updating a second entry within the control matrix based on the blackout information, wherein the second entry includes information related to when a second version of content in a second stream is to be blacked out based on the scheduling information; and
sending a control stream based on the control matrix to a set top box.

2. The method of claim 1, wherein the first version of content has a lower resolution than the second version of content.

3. The method of claim 1, wherein the first version of content is a full screen version of media content and the second version of content is a picture-in-picture version of the media content.

4. The method of claim 1, wherein the scheduling information includes information related to substitute content, wherein the first version of content is to be replaced with the substitute content in the first stream based on the scheduling information, and wherein the second version of content is to be replaced with the substitute content in the second stream based on the scheduling information.

5. The method of claim 1, further comprising:
receiving update information, wherein the update information specifies a modification to the scheduling information; and
in response to receiving the update information, updating the first entry and the second entry.

6. The method of claim 1, wherein the scheduling information includes a start time, an end time, a geographical constraint, or any combination thereof.

7. The method of claim 1, wherein sending the control stream to the set to box comprises distributing the control stream to a plurality of set top box devices based on a geographic constraint.

8. The method of claim 1, further comprising establishing a first service for the first stream over which the first version of content is to be broadcast and establishing a second service for the second stream over which the second version of content is to be broadcast.

9. The method of claim 1, wherein the control matrix is generated based on input from a content provider.

10. The method of claim 1, wherein sending the control stream comprises distributing the control stream to a video head end, wherein the video head end sends the control stream to the set top box.

11. The method of claim 1, further comprising:
receiving a message from a content provider to blackout the content; and
generating the command based on the message.

12. The method of claim 1, further comprising establishing a link between the first entry and the second entry to link the first version of content with the second version of content.

13. The method of claim 12, wherein establishing the link comprises establishing a pointer from the first stream to the second stream.

14. The method of claim 12, wherein updating the second entry comprises locating the second entry within the control matrix from the link associated with the first entry in the control matrix.

15. A system, comprising:
a processor; and
a memory accessible to the processor, the memory including instructions executable by the processor to cause the processor to:
receive, at a component of a multimedia content delivery platform, a command including blackout information related to a first version of content associated with an event, wherein the blackout information includes scheduling information;
update a first entry within a control matrix based on the blackout information in response to the command, wherein the first entry includes first information related to when the first version of content in a first stream is to be blacked out based on the scheduling information;
update a second entry within the control matrix based on the blackout information in response to the command, wherein the second entry includes second information related to when a second version of content in a second stream is to be blacked out based on the scheduling information; and
send a control stream based on the control matrix to a set top box.

16. The system of claim 15, wherein the first version of content has a lower resolution than the second version of content.

17. The system of claim 15, wherein the first stream is associated with a first multicast address and the second stream is associated with a second multicast address.

18. The system of claim 15, wherein the event comprises a live sporting event, a television program event, a sports program event, or any combination thereof.

19. A method, comprising:
receiving, at a media distribution system, a command including blackout information related to a first version of content and related to substitute content to replace the first version of content;
in response to the command, generating first control data based on the blackout information, wherein the first control data includes information related to a first stream associated with the first version of content distributed by the media distribution system, and wherein the first control data includes information related to the substitute content to replace the first version of content;
in response to the command, generating second control data based on the blackout information, wherein the second control data includes information related to a second stream associated with a second version of content distributed by the media distribution system, and wherein the second control data includes information related to substitute content to replace the second version of content; and
sending a control stream based on a control matrix that includes the first control data and the second control data to a set top box.

20. The method of claim 19, further comprising establishing a link between the first control data and the second control data to link the first version of the content with the second version of the content.

* * * * *